(12) United States Patent
Bordoni et al.

(10) Patent No.: US 10,316,857 B2
(45) Date of Patent: Jun. 11, 2019

(54) VARIABLE-PITCH FAN WITH LOW PITCH OF A TURBINE ENGINE

(71) Applicant: SAFRAN AIRCRAFT ENGINES, Paris (FR)

(72) Inventors: Nils Edouard Romain Bordoni, Moissy Cramayel (FR); Michel Gilbert Roland Brault, Moissy Cramayel (FR); Romain Guillaume Cuvillier, Moissy Cramayel (FR); Guillaume Patrice Kubiak, Moissy Cramayel (FR); Arnaud Nicolas Negri, Moissy Cramayel (FR); Nathalie Nowakowski, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 246 days.

(21) Appl. No.: 15/398,133

(22) Filed: Jan. 4, 2017

(65) Prior Publication Data

US 2017/0191495 A1 Jul. 6, 2017

(30) Foreign Application Priority Data

Jan. 5, 2016 (FR) ...................................... 16 50025

(51) Int. Cl.
*F04D 29/36* (2006.01)
*B64C 11/32* (2006.01)
(Continued)

(52) U.S. Cl.
CPC .............. *F04D 29/36* (2013.01); *B64C 11/00* (2013.01); *B64C 11/30* (2013.01); *B64C 11/325* (2013.01);
(Continued)

(58) Field of Classification Search
CPC ...... F04D 19/002; F04D 29/325; F04D 29/36; F04D 29/362; F01D 7/02; F02K 3/06; B64C 11/00; B64C 11/30; B64C 11/325
See application file for complete search history.

(56) References Cited

U.S. PATENT DOCUMENTS 2,030,953 A * 2/1936 Gemeny ............... B64C 11/343
416/246
2,219,303 A 10/1940 Fraser
(Continued)

FOREIGN PATENT DOCUMENTS

CA 2 914 699 A1 12/2014

OTHER PUBLICATIONS

French Preliminary Search Report dated Sep. 15, 2016 in Patent Application No. 1650025 (with English Translation of Category of Cited Documents).

*Primary Examiner* — Dwayne J White
*Assistant Examiner* — Andrew J Marien
(74) *Attorney, Agent, or Firm* — Oblon, McClelland, Maier & Neustadt, L.L.P.

(57) ABSTRACT

A fan of a turbine engine, the fan including a fan disk provided with blades on its periphery, the blades being pivotally mounted on the disk around a pivoting axis and having a center of gravity, and a pitch change mechanism for the blades, each blade being configured so that its center of gravity is positioned on or at a small distance from a fictitious plane which passes through the pivoting axis of the blade and which is perpendicular to the axis of revolution of the fan when the blade is in a minimum drag position.

11 Claims, 4 Drawing Sheets

(51) Int. Cl.
   *B64C 11/30*    (2006.01)
   *F02K 3/06*     (2006.01)
   *F04D 19/00*    (2006.01)
   *B64C 11/00*    (2006.01)
   *F01D 7/02*     (2006.01)
   *F04D 29/32*    (2006.01)

(52) U.S. Cl.
   CPC .................. *F01D 7/02* (2013.01); *F02K 3/06* (2013.01); *F04D 19/002* (2013.01); *F04D 29/325* (2013.01); *F04D 29/362* (2013.01)

(56) References Cited

U.S. PATENT DOCUMENTS

| | | | | |
|---|---|---|---|---|
| 5,299,914 | A * | 4/1994 | Schilling | F01D 5/141 |
| | | | | 416/203 |
| 8,197,213 | B2 * | 6/2012 | Gallet | B64C 11/32 |
| | | | | 416/155 |
| 9,920,625 | B2 * | 3/2018 | Rawlings | F01D 5/027 |
| 9,938,000 | B2 * | 4/2018 | Tajan | B64C 11/346 |
| 2012/0102915 | A1 * | 5/2012 | Baltas | F02K 1/06 |
| | | | | 60/226.3 |
| 2014/0356159 | A1 * | 12/2014 | Heikurinen | F04D 29/023 |
| | | | | 415/210.1 |
| 2016/0017728 | A1 * | 1/2016 | Fabre | F01D 7/00 |
| | | | | 416/135 |
| 2016/0032740 | A1 * | 2/2016 | Niergarth | F01D 7/02 |
| | | | | 60/805 |
| 2016/0069205 | A1 * | 3/2016 | Lecordix | F01D 17/162 |
| | | | | 415/1 |
| 2016/0121999 | A1 | 5/2016 | Tajan et al. | |
| 2017/0298954 | A1 * | 10/2017 | Qiu | F02K 3/06 |

* cited by examiner

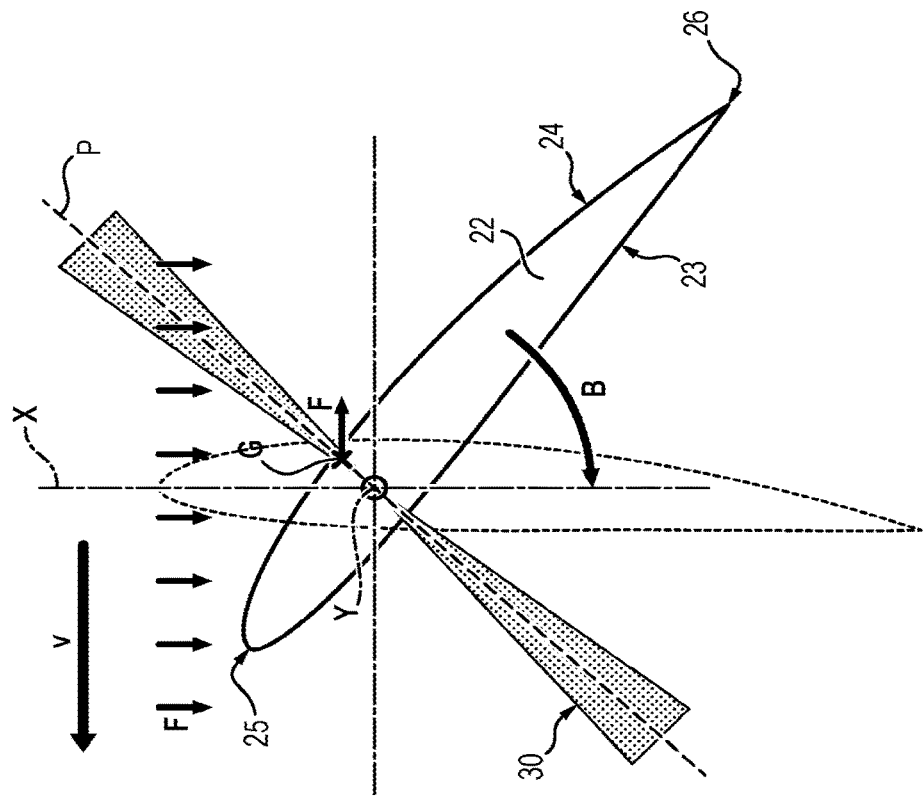
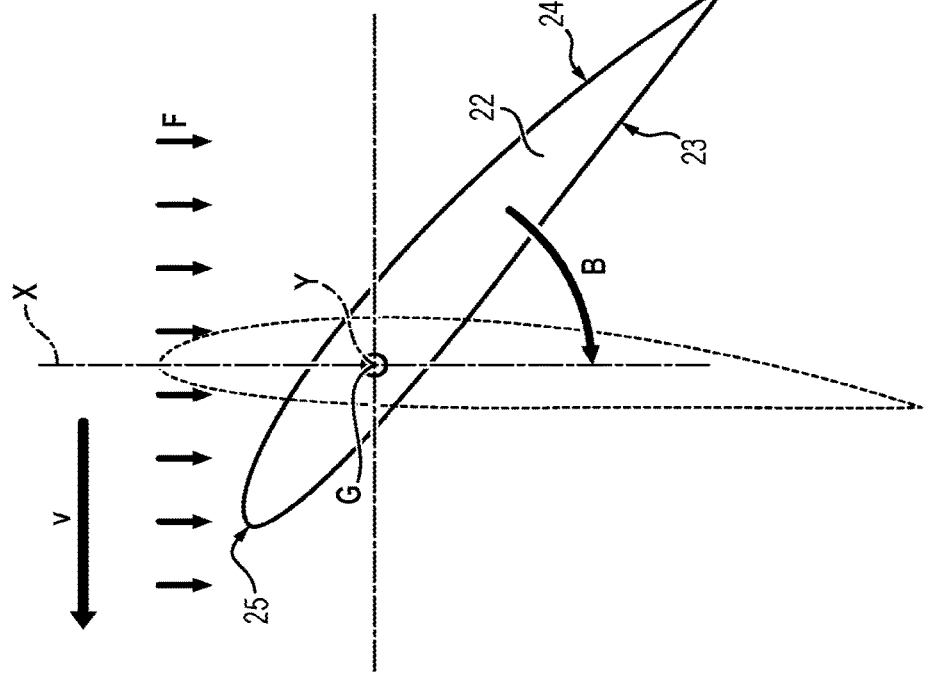

VARIABLE-PITCH FAN WITH LOW PITCH OF A TURBINE ENGINE

FIELD OF THE INVENTION

The invention relates to the field of turbine engines comprising a propeller or a variable-pitch fan.

TECHNOLOGICAL BACKGROUND

Different turbine engine architectures make use of a propeller (turboprop, open rotor) or a variable-pitch fan. This variability allows the turbine engine to adapt itself to variable flight conditions by maintaining a favorable air incidence angle on the blades. The variability of pitch settings is particularly necessary for rotors having a low-pressure ratio, like turboprop propellers and turbine engine fans having a high bypass ratio (ratio of the secondary flow rate and the primary flow rate (that passes through the primary body)).

Multiple devices have been envisioned to vary the pitch of the blades. These devices generally comprise rotation of the blade around its main axis by bevel gears, located below the root of the blade. The latter cooperate with bevel gears of a control system configured to control the pitch of the blade.

In normal use, during flight phases, the possible interval for the pitch of a blade is generally sixty degrees or so, between a low pitch position with low forward speed and a high pitch position with high speed. Pitch settings in these normal operating conditions are, conventionally, called positive.

Shown in FIG. 3 is a sectional view of an example of a blade of a rotor (of a fan or of a turboprop propeller) on which the center of gravity G of the blade has been illustrated. It will be understood that, in the event of a failure, the blade has a tendency to rotate around the pivoting axis Y (in the direction of the arrow A) under the influence of centrifugal forces Fc applied to it. The blade then finds itself in a so-called "flat" position in which the blades form an angle of about 0° with the plane of rotation of the blades (i.e. the plane comprising the pivoting axes of the blades of the rotor, which is perpendicular to the axis of rotation of the rotor), which is very unfavorable to the airplane's drag. In fact, in this position, the drag of the rotor is a maximum and can put the aircraft in jeopardy by reducing the lift/drag ratio of the aircraft, which makes it difficult to continue flying with the remaining engine(s) by generating excessive drag, by creating an over-speed hazard and/or by generating strong asymmetry between the drags of the turbine engines of the aircraft, in the event that only one of these turbine engines has failed (which can make control of the airplane impossible).

One of the constraints on systems for controlling the pitch of the blades is therefore to bring them into a position called "feathered" in the event of a failure of the pitch change mechanism of the blade. The feathered position corresponds to a pitch greater than high pitch, forming an angle of roughly 90° with the plane of rotation of the blades. In this position, the chord of the blades is aligned substantially with the relative wind, thus reducing the drag that they generate and consequently the yaw imbalance produced on the aircraft. This feathered position also allows a reduction in the residual rotation speed of the blades.

In order to avoid having the blades move to the "flat" position in flight, the blades are generally put into the feathered position in the event of failure of the pitch change mechanism.

To this end, it has been proposed to use a system of eccentric high-density (approximately 19 tons per cubic meter) counterweights subjected to the centrifugal force and the inertia whereof, much greater than that of the blades, ensures the return of the latter into the feathered position when the pitch change mechanism fails. Ten to twelve in number, angularly distributed, these eccentric counterweights can total, for themselves alone, 150 to 200 kg. One can in particular refer to document FR2957329 in the Applicant's name for more details on this type of counterweighted system. This solution can, however, be penalizing in terms of mass because it requires the use of heavy counterweights whose force is not compounded. Moreover, this system adds considerable weight to the turbine engine, which increases its specific fuel consumption.

Also proposed in document WO 2012/066240 in the Applicant's name is to attach flyweights to the bevel gears of the blade pitch control mechanism so as to position them in cantilever with respect to them. The system is integrated into the spaces located between the blades for minimum use of axial and/or radial space. In normal operation, the flyweights are held in position by the pitch control system. In the event of failure of the pitch change mechanism, the action of the centrifugal force due to rotation of the propeller drives the flyweights toward a rest position which corresponds to the feathered position of the blade. According to the embodiment mentioned in this application, the bevel gear of the blade root gives rise to a reduction ratio of approximately two between the angle of the counterweight and the pitch angle of the blade. This solution therefore allows a reduction in the mass employed due to the compounding of the effects of the flyweights. However, freedom of choice remains limited due to constraints connected to the use of space of this system with respect to the available space. These constraints can therefore lead to preventing the integration of the system into the rotor (propeller or fan).

SUMMARY OF THE INVENTION

One object of the invention is therefore to propose a system for a turbine engine comprising a variable pitch fan capable of avoiding having the blades assume a flat position in the event of failure of the pitch change mechanism, for a moderate weight in comparison with the prior art, which uses little axial and radial space and which can further be adapted to a turbine engine having a high bypass ratio.

For that purpose, the invention proposes a turbine engine fan, said fan comprising:
- a disk of annular overall shape and defining an axis of revolution of the fan, said disk being provided with blades at its periphery, said blades being pivotally mounted on the disk around a pivoting axis and having a center of gravity, and
- a pitch change mechanism of said blades, said mechanism being configured to adjust an angular position of each blade around the pivoting axis.

Each blade has a first portion, which extends in an airstream of the fan, and a second portion, which extends outside said airstream, a center of gravity of the second portion of the blade extending substantially on the pivoting axis while a center of gravity of the first portion of the blade is offset with respect to the pivoting axis, while being on or at a small distance from a fictitious plane which passes through the pivoting axis of said blade and which is perpendicular to the axis of revolution of the fan when the blade is in the minimum drag position.

Certain preferred but non-limiting features of the fan described above are the following:
- each blade is configured so that its center of gravity is located between two secant planes along a straight line corresponding to the pivoting axis and each forming an angle of ten degrees with the fictitious plane,
- each blade is configured so that its center of gravity is positioned in proximity to the pivoting axis,
- the fan comprises a hub ratio less than or equal to 0.35, comprised for example between 0.25 and 0.35, preferably comprised between 0.28 and 0.32,
- the fan has an external diameter comprised between eighty inches (203.2 centimeters) and a hundred inches (254.0 centimeters), preferably between eighty inches (203.2 centimeters) and ninety inches (228.6 centimeters).

According to a second aspect, the invention also proposes a turbine engine comprising a fan housed in a fan casing, said fan comprising:
- a disk of annular overall shape and defining an axis of revolution of the fan, said disk being provided with blades at its periphery, said blades being pivotally mounted on the disk around the pivoting axis and having a center of gravity, and
- a pitch change mechanism of said blades, said mechanism being configured to adjust an angular position of each blade around the pivoting axis.
  - Each blade has a first portion, which extends in an airstream of the fan, and a second portion, which extend outside said airstream, a center of gravity of the second portion of the blade extending substantially on a pivoting axis while a center of gravity of the first portion of the blade is offset with respect to said pivoting axis, by being on or at a small distance from a fictitious plane which passes through the pivoting axis of said blade and which is perpendicular to the axis of revolution of the fan when the blade is in a minimum drag position.

According to a third aspect, the invention proposes a turbine engine fan, said fan comprising:
- a disk of annular overall shape and defining an axis of revolution of the fan, said disk being provided with blades at its periphery, said blades being pivotally mounted on the disk around a pivoting axis and having a center of gravity, and
- a pitch change mechanism for said blades, said mechanism being configured to adjust and angular position of each blade around the pivoting axis, the pitch change mechanism being provided with a feathering system comprising eccentric counterweights and/or flyweights.

BRIEF DESCRIPTION OF THE DRAWINGS

Other features, aims and advantages of the present invention will appear more clearly upon reading the detailed description that follows, and referring to the appended drawings given by way of non-limiting examples wherein:

FIG. 2a is a section view of an example of blade FIGS. 2b to 2c are section views of embodiments of a fan blade conforming to the invention, FIG. 3, which has already been described, is a section view of an example of a blade conforming to the prior art, FIG. 4b is a detail view of a transverse section of the blade of FIG. 4a.

DETAILED DESCRIPTION OF AN EMBODIMENT

Figure 1:
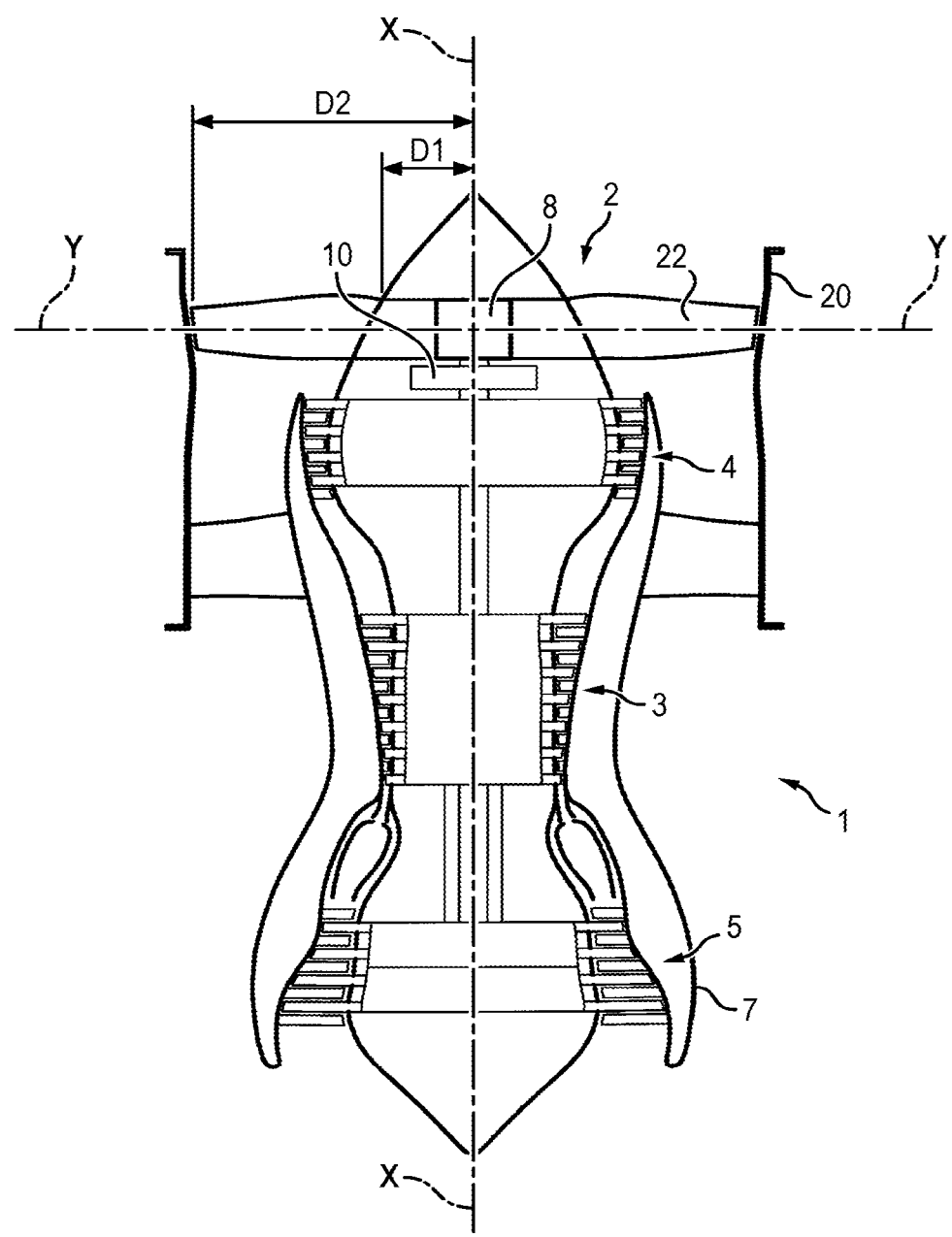
FIG. 1 is a schematic section view of an example of a turbine engine comprising a fan conforming to an embodiment of the invention.
Figure 3:
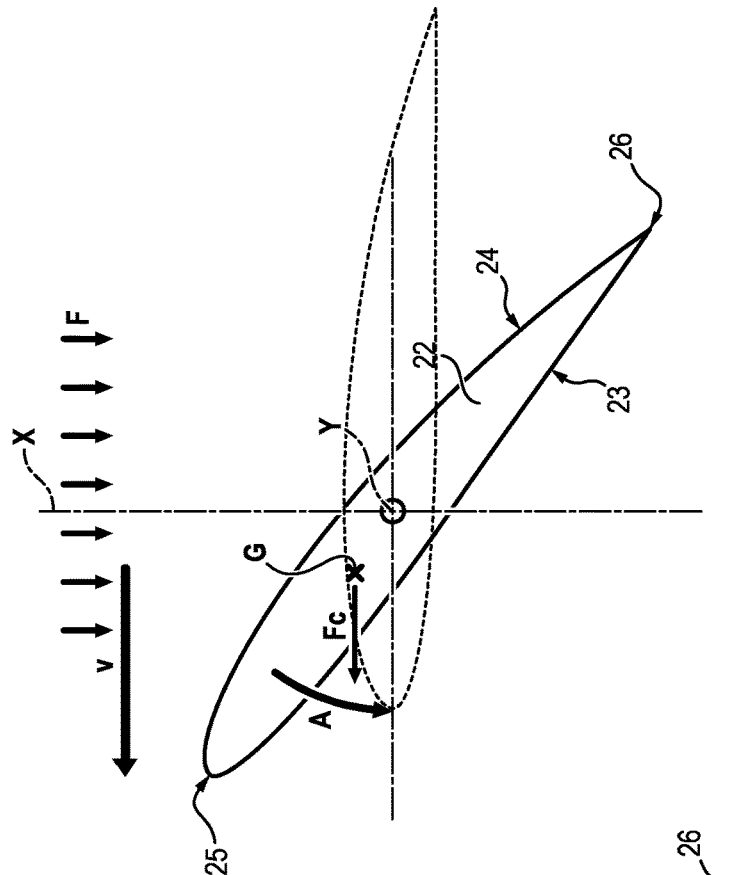

A turbine engine 1 comprises, conventionally, a fan 2 housed in a fan casing 20, a primary flow annular space and a secondary flow annular space.

The primary flow space passes through a primary body comprising, from upstream to downstream in the direction of gas flow in the turbine engine, one or more compression stages (for example a low-pressure compressor 4 and a high-pressure compressor 3), a combustion chamber, one or more turbine stages 5 (for example a high-pressure turbine and a low-pressure turbine) and an exhaust casing 7. The primary body being conventional, it will not be described in detail here.

The fan 2 comprises a fan disk provided with fan blades 22 at its periphery which, when they are put into rotation, drive the air flow F in the primary and secondary flow spaces of the turbine engine 1.

The fan disk is driven by the low-pressure shaft, which is centered on the axis X of the turbine engine 1 by a series of bearings and is driven in rotation by the low-pressure turbine 5.

A fan blade 22 conventionally comprises a leading edge 25 which faces the air flow F entering the fan 2, a trailing edge 26 opposite to the leading edge 25 and lower surface 23 and upper surface 24 walls connecting the leading edge 25 and the trailing edge 26. The blade 22 also comprises a root attached to the fan disk and a tip extending facing the fan casing. The blade 22 is pivotally mounted at its root on the fan disk around a pivoting axis Y, said pivoting axis Y extending radially with respect to the axis of rotation X of the fan 2 (which is coincident with the axis of the turbine engine 1).

The fan 2 further comprises a pitch change mechanism 8 for the blades 22, configured to adjust an angular position of each blade 22 around its pivoting axis Y depending on the flight phases of the turbine engine 1. Pitch change mechanisms 8 being known to a person skilled in the art, they will not be described in further detail here. One could for example refer to documents FR2957329 and WO2012/066240, mentioned above, which describe examples of such mechanisms 8.

In order to avoid having the blades 22 go into the flat position in the event of a failure of the pitch change mechanism 8, each blade 22 is configured so that its center of gravity G is positioned on or at a small distance from fictitious plane P which passes through the pivoting axis Y of said blade 22 and which is perpendicular to the axis of revolution X of the fan when the blade 22 is in a minimum drag position.

What is meant by minimum drag position here is the position in which the frontal section of the blade 22 is a minimum, i.e. the position in which the blade 22 recovers the least energy from the air flow F. This position corresponds to the so-called feathered position of the blade. This position corresponds overall to the position in which the mean chord over the length of the blade (i.e. between the root and the tip of the blade) is substantially aligned with an axis parallel to the axis X of the fan 2.

In this manner, in the event of a failure of the pitch change mechanism 8, the inertia forces Fc are cancelled so that only aerodynamic forces are exerted on the blade 22. These aerodynamic forces then have the effect of bringing the blade 22 into the minimum drag position.

In the embodiment illustrated in FIG. 2a, the blade 22 is configured so that its center of gravity G is positioned on its pivoting axis Y. Thus, in the event of failure of the pitch change mechanism 8, no inertia force (centrifugal force Fc) is exerted on the blade 22. The only forces exerted that can cause the blade 22 to rotate about its pivoting axis Y are therefore aerodynamic forces resulting from the air flow F.

These aerodynamic forces then have a tendency to bring the blade 22 back into the minimum drag position.

In the embodiment illustrated in FIG. 2b, the blade 22 is configured so that its center of gravity G is offset with respect to its pivoting axis Y and is positioned on the fictitious plane P defined earlier. In this manner, in the event of a failure of the pitch change mechanism 8, centrifugal forces Fc have the effect of causing the blade 22 to rotate (following the arrow B) until the fictitious plane P, which connects the center of gravity G and the pivoting axis Y of the blade 22, are collinear with the tangential speed v of the fan 2.

Figure 2C:
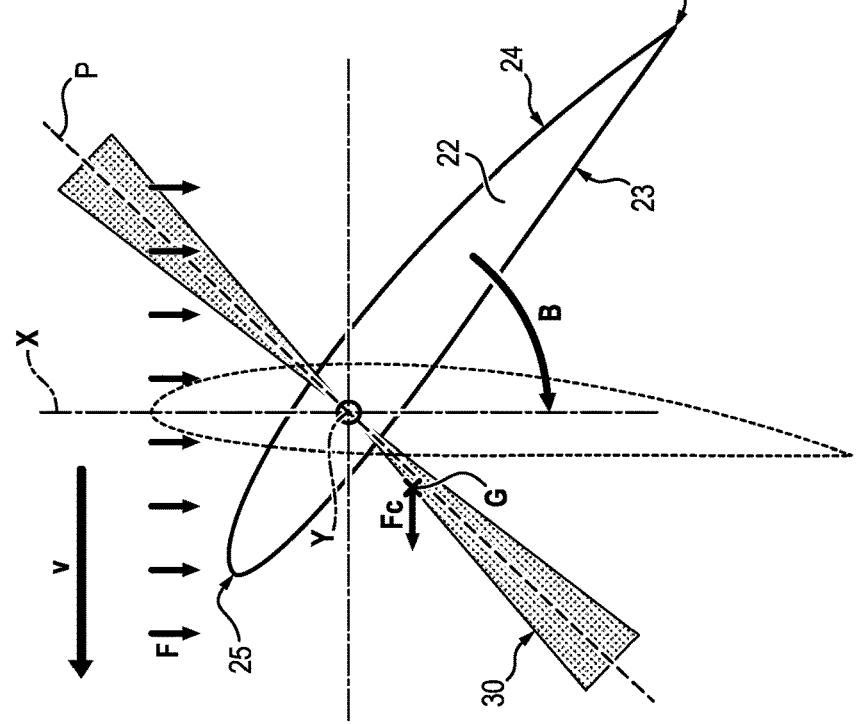

In the embodiment illustrated in FIG. 2c, the blade 22 is configured so that its center of gravity G is at a small distance from the fictitious plane P defined earlier. What is meant by small distance is that the blade 22 is configured so that its center of gravity G is between two secant planes along a straight line corresponding to the pivoting axis Y and each forming an angle of ten degrees with the fictitious plane P.

In this manner, in the event of a failure of the pitch change mechanism 8, centrifugal forces Fc have the effect of causing the blade 22 to rotate (following the arrow B) until the fictitious plane P, which connects the center of gravity G and the pivoting axis Y of the blade 22, is aligned with the tangential speed v of the fan 2.

It will be noted that, whatever the position of the center of gravity G of the blade 22 on the fictitious plane P, the aerodynamic and centrifugal forces Fc have the effect of causing the blade 22 to rotate (following the arrow B) so as to bring its leading edge 25 to face the air flow F. Typically, if the center of gravity G is closer to the lower surface wall 23 than to the upper surface wall 24 of the blade 22, as illustrated in FIG. 2b, the centrifugal forces Fc will have the effect of "pulling" the blade 2 to the left (the same direction as the velocity vector v), while if the center of gravity G is closer to the upper surface wall 24 than to the lower surface wall 23 of the blade 22, as illustrated in FIG. 2c, the centrifugal forces Fc will have the effect of "pulling" the blade 22 to the right (in the figure). The point of application of the centrifugal force Fc to the blade 22 corresponding to its center of gravity G, the blade 22 therefore does turn in every case following the arrow B, thus placing its leading edge 25 facing the air flow F.

In order to adjust the position of the center of gravity G with respect to the fictitious plane P and to thus ensure that in the event of a failure of the pitch change mechanism 8, the blade 22 goes into the minimum drag position, it is for example possible to adjust the density of the blade 22 between its root and its tip. Typically, a part such as a reinforcement made in a material having a greater density that the material constituting the blade can be applied and attached (or embedded in the mass) on one of the lower surface wall 23 and the upper surface wall 24 of the blade 22. This reinforcement can then cover all or part of the lower surface wall 23 or the upper surface wall 24. The thickness of the reinforcement can further be constant or variable, between the root and the tip of the blade 22 and/or along the lower surface wall 23 or the upper surface wall 24, so as to make it possible to precisely adjust the position of the center of gravity G with respect to the fictitious plane P without affecting its aerodynamic properties.

Alternatively or in combination with the reinforcement, the shape of the blade 22 can also be adjusted so as to place the center of gravity G on or at a small distance from the fictitious plane P. For example, the portion of the blade 22 which extends in the airstream can be offset with respect to the portion of the blade 22 which is adjacent to its root and which extends outside the airstream. In this case, the portion 22a of the blade 22 which extends outside the airstream, i.e. between the wall 22c of the airstream and the root of the blade 22, can have a center of gravity substantially coincident with the pivoting axis Y while the portion 22b of the blade 22 which extends in the airstream, i.e. between the wall 22c of the airstream and the tip of the blade 22, is formed so as to have a center of gravity on or at a small distance from the fictitious plane P. Furthermore, the effect of this adjusted shape on the aerodynamic properties of the blade 22 is acceptable.

Figure 4B:
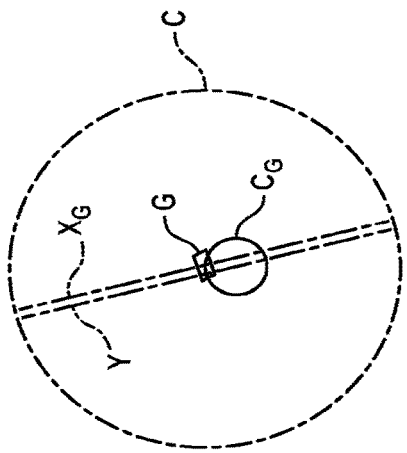
Figure 4A:
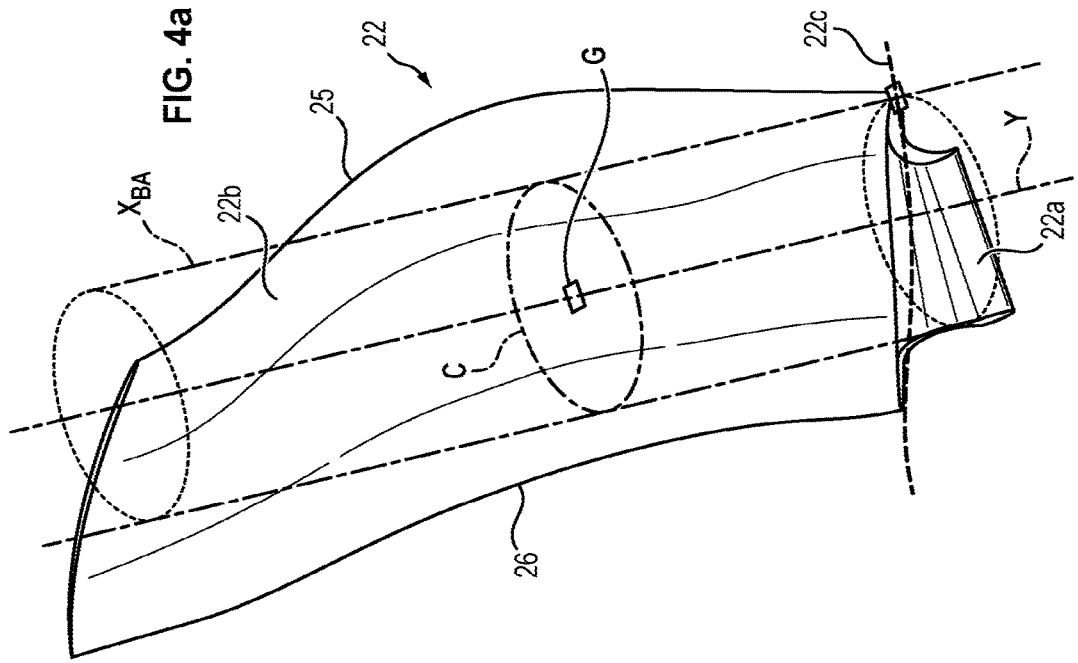
FIG. 4a is a perspective view of an embodiment of a blade conforming to the invention.

It will be noted that, for a blade 22 of a fan 2 conforming to the invention, the center of gravity G remains substantially close to the pivoting axis Y. Typically, if one defines
- a cylinder of revolution $C_G$ the axis of revolution whereof is coincident with the pivoting axis Y and the generator whereof corresponds to the straight line $X_G$ passing through the center of gravity G and which is parallel to the pivoting axis Y, and
- a cylinder of revolution C the axis of revolution whereof is coincident with the pivoting axis Y and the generator whereof corresponds to the straight line $X_{BA}$ passing through the intersection of the leading edge 26 and the wall 22c of the stream and which is parallel to the pivoting axis Y, a radius of the cylinder $C_G$ is at least twice as small, preferably at least four times as small, as a radius of the cylinder C (see FIGS. 4a and 4b).

These configurations of the blade 22 thus make it possible to eliminate the feathering systems of the eccentric counterweight or flyweight type and therefore to considerably reduce the weight of the pitch change mechanism 8 insofar as, in the event of failure of the pitch change mechanism 8, the blade 22 cannot go into the flat position.

The gain in the use of radial space (i.e. in a radial direction with respect to the axis X of the fan 2) resulting from the elimination of the feathering systems further allows:
- either reducing the hub ratio (i.e. the ratio between the distance D1 between the axis X of the fan 2 and the internal limit of the airstream in the fan 2 at the leading edge 25 of the blades 22 divided by the distance D2 between the axis X of the fan 2 and the tip of the blades 22) of the fan 2.
- or, at the same hub ratio, increasing the bypass ratio of the turbine engine 1.

It will of course be understood that is it also possible to combine these two effects by increasing the bypass ratio of the turbine engine 1 while also reducing the hub ratio.

Typically, it is thus possible to obtain a fan 2 having a hub ratio less than or equal to 0.35, for example comprised between 0.25 and 0.35, preferably comprised between 0.28 and 0.32, for a bypass ratio greater than 10, preferably comprised between 12 and 18.

In order to attain bypass ratios greater than 10, the fan 2 can also be de-coupled from the low-pressure turbine 5, thus allowing independent optimization of their respective rotation speeds. For example, the de-coupling can be carried out using a reducer, such as a star gear or planetary gear reduction mechanism 10, placed between the upstream end (with respect to the gas flow direction in the turbine engine 1) of the low-pressure shaft and the fan 2. The fan 2 is then driven by the low-pressure shaft through the reduction mechanism 10.

This de-coupling thus allows a reduction in the rotation speed and the pressure ratio of the fan 2 and an increase in the power extracted by the low-pressure turbine 5. The propulsive efficiency of the turbojet turbine engine 1 is therefore improved while its specific fuel consumption is reduced.

In one embodiment, the reduction mechanism 10 comprises a star gear reduction mechanism.

The reduction ratio of the reduction mechanism 10 is preferably comprised between 2.5 and 0.5.

The diameter of the fan 2 can be comprised between eighty inches (203.2 centimeters) and a hundred inches (254.0 centimeters), preferably between eighty inches (203.2 centimeters) and ninety inches (228.6 centimeters). What is meant by the diameter of the fan 2 is the radial distance between the axis X of revolution of the fan 2 and the tip of the blades 22 of the fan 2.

The invention claimed is:

1. A fan of a turbine engine, said fan comprising: a disk of annular overall shape and defining an axis of revolution of the fan, said disk being provided with blades at a periphery thereof, each blade being pivotally mounted on the disk around a pivoting axis and having a center of gravity, and a pitch change mechanism of each blade, said pitch change mechanism being configured to adjust an angular position of each blade around the pivoting axis, wherein each blade has a first portion, which extends in an airstream of the fan, and a second portion, which extends outside said airstream, a center of gravity of the second portion of each blade extending substantially on the pivoting axis while a center of gravity of the first portion of each blade is offset with respect to said pivoting axis by being on a fictitious plane or at a small distance from a fictitious plane which passes through the pivoting axis of each blade and which is perpendicular to the axis of revolution of the fan when each blade is in a minimum drag position.

2. The fan according to claim 1, wherein each blade is configured so that the center of gravity of each blade is located between two secant planes along a straight line corresponding to which is the same as the pivoting axis and each forming an angle of ten degrees with the fictitious plane.

3. The fan according to claim 1, wherein each blade is configured so that the center of gravity of each blade is positioned in proximity to the pivoting axis.

4. The fan according to claim 1, comprising a hub ratio less than or equal to 0.35.

5. The fan according to claim 1, having an external diameter comprised between eighty inches (203.2 centimeters) and a hundred inches (254.0 centimeters).

6. The fan according to claim 1, wherein the fan is free of a feathering system having an eccentric counterweight or a flyweight.

7. A turbine engine comprising a fan housed in a fan casing, said fan comprising: a disk of annular overall shape and defining an axis of revolution of the fan, said disk being provided with blades at a periphery thereof, each blade being pivotally mounted on the disk around a pivoting axis and having a center of gravity, and a pitch change mechanism of each blade, said pitch change mechanism being configured to adjust an angular position of each blade around the pivoting axis, wherein each blade has a first portion, which extends in an airstream of the fan and a second portion, which extends outside said airstream, a center of gravity of the second portion of each blade extending substantially on the pivoting axis while a center of gravity of the first portion of each blade is offset with respect to said pivoting axis by being on a fictitious plane or at a small distance from a fictitious plane which passes through the pivoting axis of each blade and which is perpendicular to the axis of revolution of the fan when each blade is in a minimum drag position.

8. The turbine engine according to claim 7, further comprising a turbine in fluid communication with the fan and a reduction mechanism coupling the turbine and the fan, the reduction mechanism being of the star gear or planetary gear type and having a reduction ratio comprised between 2.5 and 5.

9. The turbine engine according to claim 7, having a bypass ratio greater than or equal to 10.

10. The turbine engine according to claim 9, wherein the bypass ratio is between 12 and 18.

11. The turbine engine according to claim 7, wherein the fan is free of a feathering system having an eccentric counterweight or a flyweight.

* * * * *